Patented June 20, 1950

2,512,525

UNITED STATES PATENT OFFICE 2,512,525

PRODUCTION OF AN ALKALI METAL SALT OF SULFANILAMIDOTHIAZOLE

William S. Harmon, Elizabeth, N. J., assignor to Merck & Co., Inc., Rahway, N. J., a corporation of New Jersey No Drawing. Application April 10, 1945, Serial No. 587,616

4 Claims. (Cl. 260—239.95)

This invention relates to chemical processes and particularly to an improved and more efficient process for preparing sulfanilamido heterocyclic compounds of therapeutic value.

According to known processes for preparing sulfa drugs such as sulfapyrimidine, sulfapyrazine, sulfaquinoline, sulfapyridine, sulfathiazole, sulfabenzthiazole and the like N-acetylsulfanilyl chloride is condensed with a primary amino derivative of the appropriate heterocyclic compound, the intermediate N-acetyl-sulfanilamido heterocyclic compound is isolated, and subsequently deacetylated to produce the desired sulfa drug. Where the intermediate acetyl compound is thus isolated large amounts of condensing agent are unavoidably lost during filtration and in the filter cake. There is also considerable loss of the acetyl compound due to its solubility in the mother liquor and the difficulty of recovering it therefrom.

In the past, preparation of sulfanilamido heterocycles of U. S. P. quality from colored tar-containing reaction liquors by first crystallizing an intermediate acetyl derivative has invariably yielded a dark-colored intermediate requiring purification, followed by deacetylation and crystallization of the sodium salt of the sulfanilamido heterocycle. Known processes for preparing compounds of the class described have therefore been circuitous and costly in time, labor, and equipment required.

It is now discovered, according to the present invention, that it is possible to recover sodium sulfanilamido heterocyclic compounds in nearly pure form and in almost quantitative yield without isolation and purification of an intermediate acetyl derivative while at the same time recovering readily substantially all of the condensing agent employed. Regarded in certain of its broader aspects, the process according to the present invention, comprises reacting an N-acyl sulfanilyl halide with an amino heterocyclic compound in the presence of a condensing agent, thereby forming the corresponding N-acyl-sulfanilamido heterocycle, adding to the reaction mixture an excess of aqueous alkali metal hydroxide solution, heating the reaction mixture to effect deacylation of said heterocycle and distillation of a water-condensing agent constant boiler thereby forming an aqueous alkaline solution free of condensing agent and containing the sodium salt of the sulfanilamido heterocycle, and recovering said sodium salt from said solution. The sodium salt is readily and almost completely recovered as a single crop of crystalline product by salting out of the solution.

In carrying out the process in accordance with the present invention a heterocyclic primary amine is stirred and heated with an N-acyl sulfanilyl halide in the presence of a condensing agent. A number of organic compounds and particularly N-heterocyclic compounds such as pyridine, picoline, collidines, quinoline, and the like are suitable condensing agents. It is important that this condensation be conducted under anhydrous conditions. When the condensation is completed, an excess of aqueous alkali metal hydroxide solution, for example, aqueous sodium hydroxide, is added to the reaction mixture; the amount of alkali being more than sufficient to neutralize all acid materials present as well as those to be liberated by subsequent deacylation. The resulting mixture is heated and volatile components comprising a constant boiling mixture of water and condensing agent are distilled therefrom, water being preferably added during the distillation to replace that which is distilled. The distillation may be carried out batchwise but is preferably conducted continuously in a distillation column; the latter procedure being advantageous in that the reaction mixture is subjected to elevated temperature for a relatively short time, thereby minimizing decomposition of desired products and objectionable side reactions.

During the distillation period the N-acyl sulfanilamido heterocycle formed in the condensation is deacylated and the deacylation products are converted to corresponding alkaline metal salts. The resulting alkaline solution is removed from the distillation apparatus essentially free of condensing agent and is preferably treated with a small amount of activated charcoal and filtered. The alkali metal salt of the sulfanilamido heterocyclic compound is recovered from the solution by a salting out process, for example, by adding a highly water-soluble and essentially inert salt such as sodium chloride to the hot solution and then cooling. This precipitates the alkali sulfanilamido heterocycle in a free-filtering crystalline form and upon filtration the product recovered is of good color and high purity. Further purification to obtain a C. P. product is readily effected by conventional methods. The small amount of product remaining in the mother liquor can be recovered as crude material by neutralizing the mother liquor with hydrochloric acid or the like.

When the aqueous alkali hydroxide solution is added to the reaction mixture after condensation, the resulting mixture is very dark due to the presence of tarry by-products formed during condensation, and it is surprising that it is possible to recover from this dark mixture a highly pure and almost white crystalline product. It appears, however, that these colored impurities are quite soluble in aqueous alkali hydroxide and are effectively retained in the solution by maintaining an excess of hydroxide in the solution throughout subsequent steps of the process.

The condensing agent distilled, together with water from the reaction mixture, is recovered almost quantitatively, and is suitable for re-use in condensing additional starting materials. Thus, it will be apparent that the present process not only greatly reduces the loss of condensing agent as compared with previously known processes but also minimizes the labor and equipment required for recovering and re-using the condensing agent.

The process of the present invention has been described in general terms because it is applicable to the production of sulfanilamido heterocyclic compounds generally. Some of the better known compounds which are prepared according to this process are sulfathiazole, sulfapyridine, sulfapyrazine, sulfadiazine, sulfaquinoline, sulfaoxazole and the like as well as derivatives thereof such as sulfamethylthiazole, sulfabenzthiazole, sulfabenzoxazole, and the like.

In the condensation previously described the N-acyl sulfanilyl halide can have as the N-acyl substituent any acyl group which is removable by alkaline hydrolysis. Thus, for example, compounds such as N-acetyl sulfanilyl fluoride, N-acetyl sulfanilyl chloride, N-formyl sulfanilyl chloride, N-carbonyl-bis-(sulfanilyl chloride) and the like can be employed as starting materials.

The process of the present invention is also applicable to the treatment of N-acyl sulfanilamido heterocyclic intermediates obtained by procedures other than that here described. Thus, an intermediate of this type, either isolated or in the presence of a condensing agent, can be treated with an excess of aqueous alkali metal hydroxide; the condensing agent, if present, removed by distillation of a water-condensing agent constant boiler; and the resulting solution worked up in the manner described to give a substantially quantitative yield of almost pure product.

The following examples illustrate methods of carrying out the present invention, but it is to be understood that these examples are given by way of illustration and not of limitation.

Example I

About 60 parts (by weight) of aminothiazole is dissolved in about 120 parts of $\alpha$-picoline and the solution is warmed to 75° C. About 150 parts of N-acetylsulfanilyl chloride is added with stirring, cooling if necessary to maintain the temperature at about 75–80° C. The solution is stirred for about two hours at 75° C. and the reaction mixture is then neutralized with about 210 parts of 34% aqueous sodium hydroxide solution. The resulting solution is fed continuously to a distillation apparatus and water and $\alpha$-picoline are distilled therefrom as a constant boiler. Water is added to replace that being distilled and is preferably added as steam thereby supplying heat for the distillation. During the distillation, N-acetyl sulfanilamido thiazole formed in the condensation is deacetylated and the resulting sodium sulfanilamido thiazole (or sodium sulfathiazole) in alkaline solution is drawn continuously from the distillation apparatus. By maintaining the temperature at the bottom of the apparatus or column at about 102° C. the solution thus drawn from the apparatus is completely free of $\alpha$-picoline.

The hot alkaline solution is treated with about two parts of activated charcoal and filtered hot, and the filtrate adjusted to about 540 parts by addition of water. About 38 parts of sodium chloride is dissolved in the hot solution and the solution is stirred and cooled to crystallize sodium sulfathiazole. The product, after filtration and washing, is almost white and essentially free of impurities. It is readily purified further by conventional methods to yield C. P. sulfathiazole.

Example II

About 50 parts (by weight) of aminopyridine is dissolved in about 130 parts of $\alpha$-picoline and the solution warmed to about 70° C. About 130 parts of N-acetylsulfanilyl chloride is added portionwise with stirring while maintaining the temperature below about 76° C. with external cooling. When addition is completed, the solution is stirred for about two hours at 74–76° C. and then neutralized with about 216 parts of 34% sodium hydroxide solution. Sufficient water is added (about 500 parts) to dissolve all solid components and to form a single phase. The solution is then fed continuously to a distillation column, picoline is distilled with water as a constant boiler, and the alkaline solution containing deacetylated sodium sulfapyridine (the deacetylation occurs during the passage through the column, which requires about twenty minutes) is drawn continuously from the column, treated with about two parts of charcoal, and filtered. About 92 parts of sodium chloride is dissolved in this solution and the whole cooled, with stirring, to crystallize the sodium sulfapyridine. The product is filtered and washed with saturated sodium chloride solution to give a nearly white sodium sulfapyridine which is readily purified by conventional methods to C. P. sulfapyridine. A small amount of crude sulfapyridine is recovered upon neutralization of the sodium salt liquors.

Example III

About 50 parts (by weight) of 2-aminopyrazine in about 150 parts of pyridine is heated for about two hours at 74–75° C. with about 130 parts of N-acetylsulfanilyl chloride. About 216 parts of a 34% solution of sodium hydroxide and about 500 parts of hot water are added to the reaction mixture and charged to a distillation apparatus. Pyridine and water are distilled as a constant boiler and during the distillation N-acetyl sulfanilamido-pyrazine, formed in the initial condensation, is deacetylated and converted to the sodium salt. When the pyridine is completely removed the resulting alkaline solution of sodiumsulfapyrazine (sodium sulfanilamidopyrazine) is drawn from the apparatus, treated with about 2 parts of charcoal, and filtered. About 40 parts of sodium chloride is dissolved in the hot filtrate, and the solution is stirred and cooled to crystallize sodium sulfapyrazine. The product is filtered, washed with saturated sodium chloride solution, and purified by conventional methods to give C. P. sulfapyrazine.

Example IV

The procedure of Example I is repeated using about 118 parts by weight of N-formyl sulfanilyl chloride instead of the N-acetyl derivative.

Example V

The procedure of Example I is repeated using about 105 parts by weight of carbonyl-bis (p-aminobenzene sulfonyl chloride) instead of the N-acetyl-sulfanilyl chloride. The carbonyl-bis-(p-aminobenzene sulfonyl chloride) is prepared by condensing urea with aniline and reacting the condensation product with chlorosulfonic acid.

Modifications may be made in carrying out the present invention without departing from the spirit and scope thereof, and the invention is to be limited only by the appended claims.

What is claimed is:

1. The process that comprises adding to the reaction mixture, obtained by condensing an N-acyl sulfanilyl halide with aminothiazole in the presence of an N-heterocyclic compound as a condensing agent, an excess of an aqueous alkali metal hydroxide solution, subjecting the mixture thus obtained to distillation, thereby separating a constant boiling mixture of water and condensing agent from a residual alkaline solution containing an alkali metal salt of sulfanilamido thiazole, and crystallizing said salt from the residual solution.

2. The process that comprises adding to the reaction mixture, obtained by condensing N-acetyl-sulfanilyl chloride with aminothiazole in the presence of an N-heterocyclic compound as a condensing agent, an excess of an aqueous sodium hydroxide solution, subjecting the mixture thus obtained to distillation, thereby separating a constant boiling mixture of water and condensing agent from a residual alkaline solution containing the sodium salt of sulfanilamido thiazole, and crystallizing said salt from the residual solution.

3. The process that comprises adding to the reaction mixture, obtained by condensing an N-acyl sulfanilyl halide with aminothiazole in the presence of an N-heterocyclic compound as a condensing agent, an excess of an aqueous alkali metal hydroxide solution, subjecting the mixture thus obtained to distillation, thereby separating a constant boiling mixture of water and condensing agent from a residual alkaline solution containing an alkali metal salt of sulfanilamido thiazole, dissolving an inert and highly water soluble salt in said residual solution while hot, and cooling said solution to crystallize said alkali metal salt of sulfanilamido thiazole.

4. The process that comprises adding to the reaction mixture, obtained by condensing N-acetyl-sulfanilyl chloride with aminothiazole in the presence of an N-heterocyclic compound as a condensing agent, an excess of an aqueous sodium hydroxide solution, subjecting the mixture thus obtained to distillation, thereby separating a constant boiling mixture of water and condensing agent from a residual alkaline solution containing the sodium salt of sulfanilamido thiazole, dissolving sodium chloride in said residual solution while hot, and cooling said solution to crystallize the sodium salt of sulfanilamido thiazole.

WILLIAM S. HARMON.

REFERENCES CITED

The following references are of record in the file of this patent:

UNITED STATES PATENTS

| Number | Name | Date |
|---|---|---|
| 2,259,222 | Ewins et al. | Oct. 14, 1941 |
| 2,281,014 | Winnek | Apr. 28, 1942 |
| 2,288,531 | Klarer | June 30, 1942 |
| 2,358,031 | Roblin et al. | Sept. 12, 1944 |

FOREIGN PATENTS

| Number | Country | Date |
|---|---|---|
| 545,419 | Great Britain | May 26, 1942 |

OTHER REFERENCES

Sprague et al., J. Am. Chem. Soc., vol. 63 (Feb. 1941); pp. 578–580.

Raiziss et al., J. Am. Chem. Soc., vol. 63 (Oct. 1941); pp. 2739–2740.

Postovsky et al., Zhurnal Prikladnoi Khimii, XVII, No. 1, pp. 65–75 (1944). Abstracted in Chem. & Met. Eng. Apr. 1945, pp. 214 and 216.